United States Patent [19]

Winter et al.

[11] Patent Number: 5,213,828

[45] Date of Patent: May 25, 1993

[54] HEATABLE WINDSHIELD

[75] Inventors: John A. Winter, Pittsburgh; Bruce A. Bartrug, Lower Burrell, both of Pa.

[73] Assignee: PPG Industries, Inc., Pittsburgh, Pa.

[21] Appl. No.: 857,144

[22] Filed: Mar. 25, 1992

Related U.S. Application Data

[63] Continuation-in-part of Ser. No. 658,137, Feb. 25, 1991, abandoned, which is a continuation-in-part of Ser. No. 375,090, Jul. 3, 1989, abandoned, and a continuation-in-part of Ser. No. 456,711, Dec. 26, 1989, abandoned.

[51] Int. Cl.$^5$ .................. B32B 3/10; B32B 17/06; B32B 31/14
[52] U.S. Cl. .................. 428/46; 428/192; 428/209; 428/426; 428/432; 428/433; 52/171; 52/208; 219/203; 219/522; 156/107
[58] Field of Search ............ 428/34, 46, 192, 209, 428/426, 432, 433; 52/171, 208; 216/84.1, 77.1; 338/292; 219/203, 522; 156/107

[56] References Cited

U.S. PATENT DOCUMENTS

| | | | |
|---|---|---|---|
| 2,584,859 | 2/1952 | Gaiser | 201/73 |
| 3,041,436 | 6/1962 | Brady | 219/19 |
| 3,311,517 | 3/1967 | Keslar et al. | 156/104 |
| 3,549,785 | 12/1970 | Timko, Jr. et al. | 174/68.5 |
| 3,616,122 | 10/1971 | Orcutt et al. | 161/45 |
| 3,779,878 | 12/1973 | Swift et al. | 204/140 |
| 3,783,242 | 1/1974 | Barnard | 219/546 |
| 3,789,191 | 1/1974 | Spindler | 338/24 |
| 3,789,192 | 1/1974 | Spindler | 219/522 |
| 3,790,752 | 2/1974 | Boaz et al. | 219/522 |
| 3,791,910 | 2/1974 | Bowser | 161/45 |
| 3,794,809 | 2/1974 | Beck et al. | 219/203 |
| 3,852,236 | 12/1974 | Heilman | 260/42.18 |
| 3,895,218 | 7/1975 | Cooke | 219/543 |
| 4,029,942 | 6/1977 | Levin | 219/522 |
| 4,046,951 | 9/1977 | Stefanik | 428/412 |
| 4,086,595 | 4/1978 | Cherenko et al. | 343/713 |
| 4,121,014 | 10/1978 | Schaffer | 428/412 |
| 4,197,449 | 4/1980 | Fessenden | 219/549 |
| 4,204,374 | 5/1980 | Olson | 52/208 |
| 4,230,754 | 10/1980 | Maher et al. | 428/76 |
| 4,277,294 | 7/1981 | Orcutt | 156/102 |
| 4,284,677 | 8/1981 | Herlicek | 428/192 |
| 4,321,777 | 3/1982 | Sauret et al. | 52/308 |
| 4,324,373 | 4/1982 | Zibritosky | 244/121 |
| 4,453,669 | 6/1984 | Karla et al. | 237/12.3 |
| 4,543,466 | 9/1985 | Ramus | 219/203 |
| 4,593,173 | 6/1986 | Bower et al. | 219/203 |
| 4,610,771 | 9/1986 | Gillery | 204/192.1 |
| 4,616,124 | 10/1986 | Greenhalgh | 219/505 |
| 4,782,216 | 11/1988 | Woodward | 219/547 |
| 4,786,784 | 11/1988 | Nikodem et al. | 219/543 |
| 4,820,902 | 4/1989 | Gillery | 219/203 |
| 4,960,631 | 10/1990 | Walters et al. | 428/192 |
| 5,023,403 | 6/1991 | Eckardt et al. | 174/94 R |

FOREIGN PATENT DOCUMENTS

| | | |
|---|---|---|
| 2914061 | 10/1979 | Fed. Rep. of Germany. |
| 3227647 | 1/1984 | Fed. Rep. of Germany. |
| 3402518 | 8/1985 | Fed. Rep. of Germany. |
| 0046359 | 2/1982 | France. |

OTHER PUBLICATIONS

Product Bulletin, "Plastilock® 425 Thixotropic, Low Gravity Sealant", B. F. Goodrich, Adhesive Systems Division, 1986.

Product Bulletin, "Plastilock® 435 UV Stable, Low Gravity Sealant", B. F. Goodrick, Adhesive Systems Division.

Spec-Data, "Joint Sealers, Silicone Insulating Glass Adhesive/Sealant"Dow Corning Corporation, Nov. 1985.

"Information about Silicone Elastomers", Dow Corning® 982 Silicone Insulating Glass Sealant, Dow Corning Corporation, 1983.

"Information about Silicone Elastomers", Dow Corning 732 TM Multi-Purpose Sealant, Dow Corning Corporation, 1986.

Primary Examiner—Patrick J. Ryan
Assistant Examiner—Elizabeth Evans
Attorney, Agent, or Firm—Andrew C. Siminerio

[57] ABSTRACT

The electrical connections for an electrically heatable windshield are sealed prior to the laminating operation to prevent gas from entering the interior of the windshield through the bus bar leads when the windshield is subjected to the elevated temperatures and pressures of the laminating operation.

23 Claims, 2 Drawing Sheets

HEATABLE WINDSHIELD

This application is a continuation-in-part application of U.S. Ser. No. 07/658,137, filed Feb. 20, 1991, now abandoned which is a continuation-in-part application of U.S. Ser. No. 07/375,090, filed Jul. 3, 1989, now abandoned, and is also a continuation-in-part of U.S. Ser. No. 07/456,711, filed Dec. 26, 1989, now abandoned.

BACKGROUND OF THE INVENTION

1. Field of the Invention

This invention relates to laminated transparencies and, in particular, to a heatable, laminated windshield wherein air is prevented from diffusing into the interior of the windshield during lamination.

2a. Technical Considerations

It has been known to pass electric current through a transparent conductive coating on a transparency in order to raise its temperature. Generally, the transparency includes a spaced pair of bus bars electrically interconnected by a conductive coating. The bus bars are usually connected by leads to a power source to distribute current from the power source through the coating. Where the transparency is a laminated windshield, passing current through the coating elevates the temperature of the laminate sufficient to melt snow or ice that has accumulated on an exposed surface of the windshield.

A heatable windshield may include a cut-out section, or notch area, along an edge of one of the plies of the windshield that exposes a lead portion of the bus bars and provides a location at which the power source can be connected to the windshield. During lamination, the windshield components are exposed to elevated temperatures and pressures. After lamination, air bubbles have been observed within the windshield in the vicinity of the notch area. It is believed that this defect is the result of air diffusing through the bus bar leads into the interior of the windshield during lamination. Not only is the bubbling a visible and objectionable defect but excessive bubbling within the windshield may reduce the windshield strength in this area and cause delamination.

It would be advantageous to have a windshield that does not have or will not develop bubbles in the interior of the windshield in the vicinity of the notch area.

2b. Patents of Interest

U.S. Pat. Nos. 3,789,191 and 3,789,192 to Spindler teach a heated window with a temperature sensing device, wherein the electrical leads to the temperature sensor are embedded within the plastic interlayer of the window.

U.S. Pat. No. 3,790,752 to Boaz et al. teaches a heatable, laminated windshield in which an electrical connection is made within the windshield to a transparent interlayer which has a conductive coating thereon. The connection is sealed so that moisture cannot penetrate the laminate.

U.S. Pat. Nos. 3,794,809 to Beck; 4,543,466 to Ramus; and 4,786,784 to Nikodem et al. teach an electrically heatable windshield with opposing bus bars that are electrically interconnected by an electroconductive coating on an interior surface of the windshield. In Beck, the leads to the bus bars extend outside of the windshield assembly. In Ramus and Nikodem et al., the leads extend into a cut-out portion, or terminal area, along an edge of the windshield. Electrical power is provided to the leads at the terminal area.

U.S. Pat. No. 4,593,175 to Bowser et al. teaches a coating composition to prevent moisture from penetrating along a power cable of an electrically heated architectural glazing unit.

SUMMARY OF THE INVENTION

The present invention teaches a laminate having a gas permeable material which extends along a notch area of the laminate beyond one of the plies of the laminate wherein the laminate does not have nor will it develop bubbles in the interior of the laminate in the vicinity of the notch area after the bonded laminate is exposed to high moisture and temperature conditions. The moisture and temperature conditions disclosed in the present invention are a boil test wherein the laminate is submerged in water at 212° F. (100° C.) for two hours.

In one particular embodiment of the invention, a surface of a first ply of the laminate includes a pair of opposing bus bars interconnected by an electroconductive coating. The bus bars are made of a gas permeable material and are bonded to the first ply's surface. The bus bars extend to an electrical connection area along a peripheral edge of the laminate. A second ply overlays the first ply and includes a cut-out section at the connection area that exposes a portion of the bus bars. The exposed portions of the bus bars are sealed prior to bonding the plies together to prevent gas from entering the interior of the laminate through the bus bars.

In an additional embodiment of the invention, the laminate is a heatable windshield. The bus bars are a conductive ceramic enamel bonded to an interior surface of one of the glass plies of the windshield. The entire electrical connection area is sealed with a sealant, such as a butyl-based or a silicone elastomer sealant or a soldering flux. If required, the remaining portion of the notch area may be filled with a flexible epoxy.

DETAILED DESCRIPTION OF THE INVENTION

The description of the invention is taught in connection with a heatable, laminated transparency comprised of two glass plies bonded together by a thermoplastic interlayer and an electroconductive coating positioned between the plies. The preceding construction represents a typical heatable windshield construction, but it is understood that the invention can be practiced to make any construction of heatable laminated transparencies having two or more plies of glass or plastic or any combination thereof. Furthermore, the invention is not limited to fabricating an automotive windshield but may be practiced in the fabrication of any transparency where there is a problem of gas diffusing into the interior of a laminated transparency.

Figure 1:
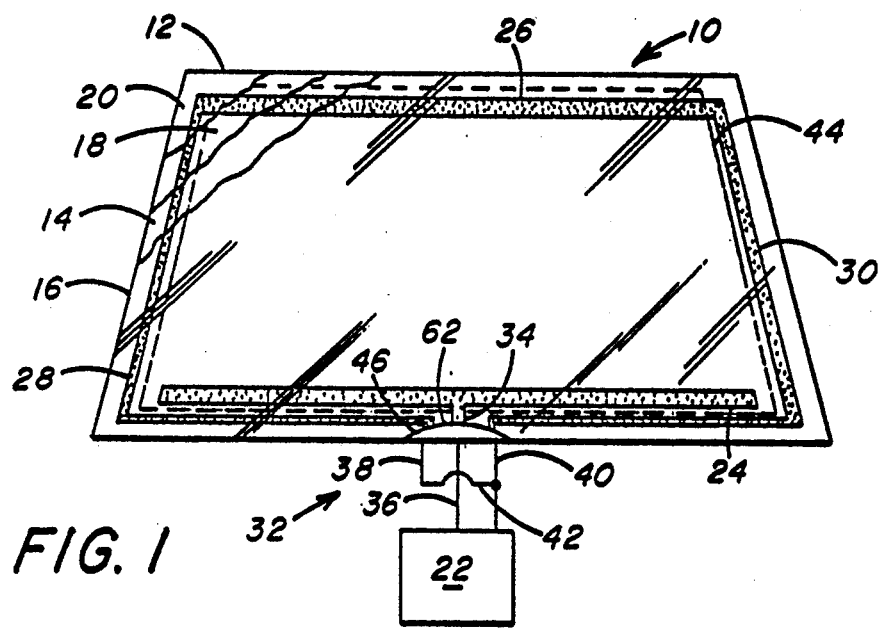
FIG. 1 is a plan view of a heatable windshield incorporating features of the present invention, with portions removed for clarity.
Figure 3:
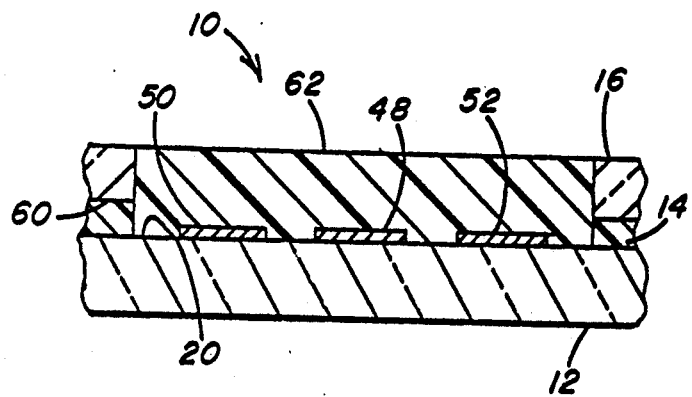
FIG. 3 is a view taken along line 3—3 of FIG. 2 showing a sealant in the notch area of the windshield.
Figure 4:
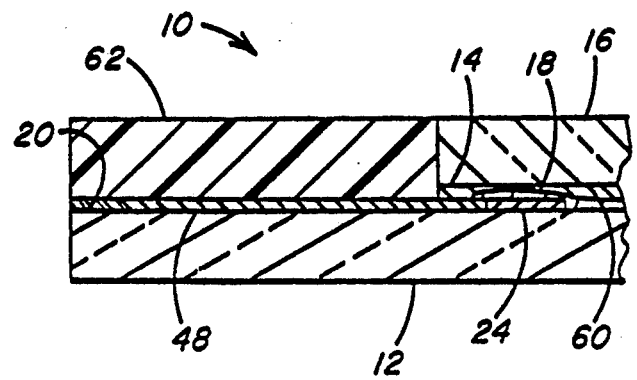
FIG. 4 is a view taken along line 4—4 of FIG. 2 showing a sealant in the notch area of the windshield.

Referring to FIGS. 1, 3, and 4, the transparency 10 is a heatable windshield which includes an outboard glass ply 12, i.e. the ply furthest from the vehicle interior, a plastic interlayer 14, which may be polyvinylbutyral as is commonly used for laminated windshields, and an inboard glass ply 16. Although not limiting in the present invention, in the preferred embodiment of the invention, the windshield 10 has a heating arrangement including an electroconductive coating 18 preferably positioned on the inside surface 20 of the outboard glass ply 12. Various coatings may exhibit the necessary combination of transparency and electroconductivity required to serve as the heating element for the transparency 10. A preferred coating is similar to that disclosed in U.S. Pat. No. 4,610,771 to Gillery, which teachings are hereby incorporated by reference. These coatings generally include one or more silver films between pairs of zinc stannate films, each of which may be applied sequentially by magnetron sputtering. In one particular embodiment of the invention, the coating taught in U.S. Pat. No. 4,610,771 exhibits an approximate resistivity of about 7 to 8 ohms per square with a single silver film layer having a thickness of about 110 Angstroms.

Electrical power from a power supply 22 passes to the electroconductive coating 18 through a bus bar and lead arrangement which, although not limiting in the present invention, is similar to the double feed bus bar arrangement disclosed in U.S. Pat. No. 4,820,902 to Gillery, which teachings are incorporated by reference. Referring to FIG. 1, a bottom bus bar 24 and top bus bar 26 are positioned on surface 20 of the glass ply 12 in contact with the coating 18. The electrical connection to the upper bus bar 26 is made by a pair of extensions of the bus bar 26, i.e. leads 28 and 30, each extending along opposing side portions and bottom edge of the windshield 10 to a terminal area 32. Electrical access to the bottom bus bar 24 is had by a lead 34 which extends from the bus bar 24 to the terminal area 32. Although not limiting in the present invention, the electrical connections to the bottom bus bar 24 and to the top bus bar 26 via leads 28 and 30 are preferably made along the bottom edge of the windshield 10 at the terminal 32 as illustrated in FIG. 1, but it should be appreciated that the connections may be made to the windshield 10 at any convenient location.

With continued reference to FIG. 1, wire 36 connects the bottom bus bar 24 to one pole of an electrical power source 22. Leads 28 and 30 leading to the top bus bar 26 are connected in common to the opposite pole of power source 22 by means of wires 38 and 40 and jumper wire 42.

Figure 2:
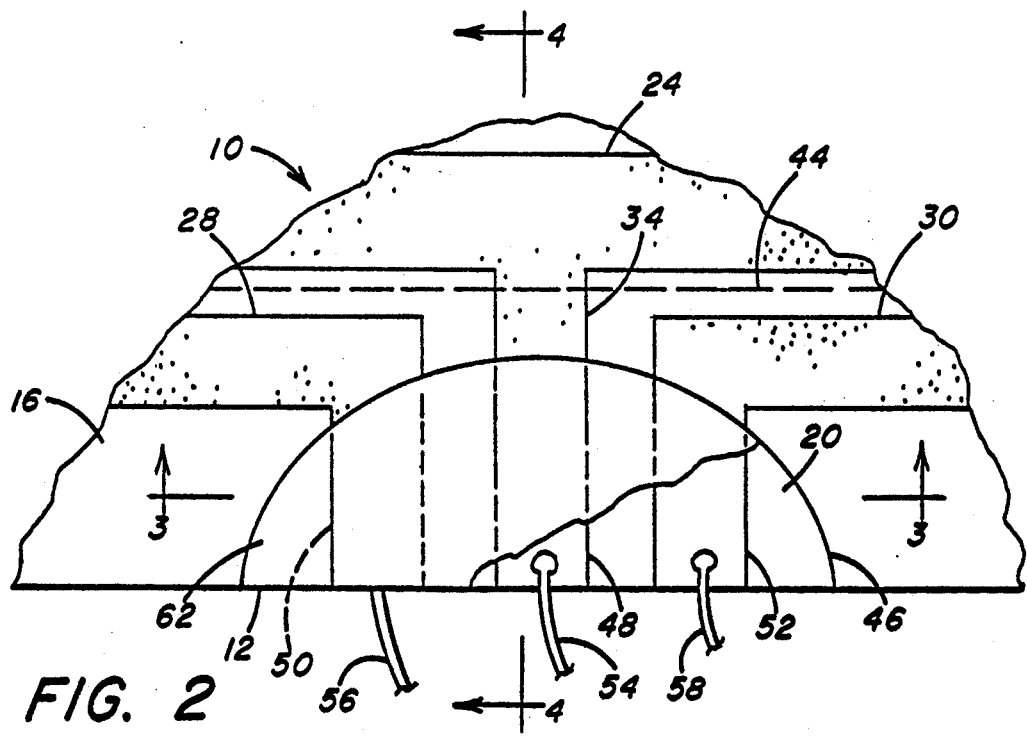
FIG. 2 is an enlarged view of the notch area of the windshield shown in FIG. 1, with portions removed for clarity.

Referring also to FIG. 2, the leads 28 and 30 are electrically insulated from the coating 18 and bottom bus bar 24 in any convenient manner known in the art to ensure that the power to the coating 18 is delivered through the bus bars 24 and 26. Although not limiting in the present invention, the edge of the coating 18 is spaced from edge of the transparency 10, as indicated by line 44 in FIGS. 1 and 2 and the leads 28 and 30 are positioned within this uncoated, marginal area.

The bus bars and leads are preferably made of a silver containing ceramic frit material, as is well known in the art, and may be applied in any convenient manner, e.g. screen printing onto the glass surface 20 of the glass ply 12. After printing, the frit material is heated, or "fired", to melt the frit material and fuse it onto the glass surface. An opaque ceramic enamel border (not shown) may optionally be applied on surface 20 of the glass ply 12 to hide the bus bars 24 and 26 and leads 28 and 30.

After the bus bars and leads are fired onto the glass ply 12 and the coating 18 is applied to surface 20, the interlayer 14 is positioned between the glass sheets 12 and 16 and the entire assembly is prepressed and subsequently laminated in any convenient manner available in the art, e.g. in an air autoclave under elevated temperature and pressure conditions, to form a unitary structure, i.e. a laminated windshield.

With reference to FIGS. 2, 3, and 4, inner ply 16 includes a cut-out or notch area 46 to expose portion 48 of lead 34 and portions 50 and 52 of leads 28 and 30, respectively, and provide access for electrical connection to the bus bars 24 and 26 from the power source 22 (shown only in FIG. 1). In particular, referring to FIG. 2, wires 54, 56, and 58 are electrically interconnected to lead portions 48, 50, and 52, respectively, in any convenient manner known in the art, e.g. soldering.

It has been observed that when the notch area 46, and more particularly the lead portions 48, 50 and 52 are not sealed prior to being exposed to the elevated temperatures and pressures of laminating, bubbles form in the interlayer 18 in the vicinity of the notch area 46. The highest concentration of bubbles generally appears in that portion of the interlayer 18 in the vicinity of the notch area 46 that overlays the lower bus bar 24 and the leads 28, 30 and 34. Bubbles have been observed on the inner surface 60 of the inner glass ply 16 along the leads 28, 30 and 34 and along bottom bus bar 24 in the vicinity of the notch area 46. It is believed that these bubbles are caused by air which diffuses through the exposed portions 48, 50, and 52 of the silver ceramic leads 28, 30, and 34, respectively, and into the interior of the windshield 10 during lamination and is absorbed by the interlayer 18 and/or bus bar 24 and leads 28, 30 and 34. The absorbed air is then released and forms bubbles in the windshield after the pressure is reduced to normal atmospheric levels. As will be discussed later, even if bubbling is not immediately apparent after lamination, the air that is absorbed in the interlayer, leads and/or bus bar will, over time, be released within the windshield and form bubbles between its inboard and outboard glass plies. The bubbles detract from the aesthetics of the windshield and excessive bubbling may reduce the strength of the windshield 10 in the notch area 46 and cause delamination.

To further study this bubble formation condition, a test was used to accelerate the growth of bubbles in the laminated windshield in the vicinity of the notch area 46. The test is similar to that specified in MVSS 205 ANSI 26.1-1983, Test 5.4 Boil, Test 4 which is used to simulate exposure to tropical temperature over an extended period of time. More particularly, in the test used by the inventors, referred to hereinafter as the boil test, the laminated windshield was submerged in water at 212° F. (100° C.) for 2 hours.

Laminated windshield assemblies which did not have their notch area 46 sealed prior to lamination in an air autoclave were boil tested. Test results showed that the interlayer 18, as viewed through the inboard glass ply 16, in the vicinity of the notch area 46 had a large quantity of bubbles, indicating that air had passed through the lead portions 48, 50 and 52 and into the interior of the windshield 10 during lamination. The concentration of the bubbles decreases as one moves further from the notch area 46 with the highest bubble concentration generally being in the interlayer directly overlaying the bus bar 24 and leads 28, 30 and 34 in the vicinity of the notch area 46. In some instances, the interlayer overlaying the lower bus bar and leads in the vicinity of the notch area 46 had visible bubbles covering up to 90% of this overlaying area, i.e. a 90% bubble concentration.

To protect against this condition and with continued reference to FIGS. 2 through 4, in the windshield of the present invention an air impervious sealant 62 is applied to the notch area 46 to prevent air from diffusing through the lead portions and into the interior of the windshield 10. The sealant 62 must be able to survive the elevated temperatures and pressures of a laminating cycle, which for automotive windshields are typically on the order of about 275° F. (135° C.) and 200 psi ($1.38 \times 10^6$ Pa). In addition, the sealant material preferably should not give off toxic fumes or other gases during lamination. Furthermore, the sealant material should not adversely affect the silver lead portions 48, 50, and 52, or any exposed coating 18 in the notch area 46. In particular, sulfur containing sealant materials should be avoided because the sulfur or sulfur compounds may react with the silver, forming silver sulfides which will reduce the electro-conductivity of the leads and/or coating in the notch area 46. Since electrical power to the windshield 10 will be provided through the notch area 46, the sealant materials should also be non-electroconductive to prevent shorting of the windshield circuitry by electrically interconnecting the lead portion 48 with the adjacent lead portions 50 and 52. Lastly, the sealant material must be sufficiently resilient so as to not induce any undue stresses on the windshield in the notch area 46.

Sealants that have been used in the practice of the invention include silicone elastomers, and in particular, elastomer materials available from Dow Corning Corp., Michigan, under the trademarks DOW CORNING 732 TM multi-purpose sealant and DOW CORNING ® 982 silicone insulating glass sealant. DOW CORNING 732 TM sealant is a one-component material that dries tack free in about 20 minutes and forms a tough, rubbery solid. Material data sheets for this sealant indicate that this material will corrode copper and copper containing alloys, magnesium, and zinc and zinc containing alloys. Therefore the use of DOW CORNING 732 TM sealant with these metals should be avoided. Although the DOW CORNING 732 TM sealant satisfactorily seals the notch area 46, during lamination of the windshield components, it has been observed to bubble, resulting in a less than desirable appearance. DOW CORNING ® 982 sealant is a two-part, variable cure rate, high modulus, elastomeric sealant that provides good adhesion to uncoated and coated glass and will not bubble as severely as the DOW CORNING 732 TM sealant during lamination. This sealant will cure within 15 to 60 minutes, depending on the ratio between the base and curing components of the sealant. In addition, it was found that increasing the amount of the curing component relative to the amount of the base component will reduce the amount of bubbling and reduce the curing time. Both the DOW CORNING 732 and 982 sealants will not flow under their own weight so that a thick layer of sealant can be used to fill the notch area 46 without the sealant flowing out of the notch area 46. These sealants are applied to the notch area 46 in any convenient manner and although not limiting to the present invention, the sealants are preferably applied using a caulking gun. A putty knife is used to smooth the surface of the sealant before it begins to cure.

In operation, after the windshield assembly 10 is prepressed prior to lamination, the interlayer 14 is removed from the notch area 46 and the electrical connectors 54, 56, and 58 or any other type of well known connector, are connected in any convenient manner to lead portions 48, 50, and 52, respectively. As an alternative, the interlayer 14 can be precut so that it does not extend into the notch area 46. The sealant 62 is then applied in the notch area 46 and allowed to dry or cure. The assembly 10 is then laminated.

Windshields 10 sealed prior to laminating as discussed above showed virtually no bubbling in the vicinity of the notch area 46 after boil testing.

Although the embodiment of the invention illustrated in FIGS. 1 through 4 show the entire notch area 46 completely filled by the sealant 62 prior to lamination, it should be appreciated that only the exposed surface of the lead portions 48, 50, and 52 have to be coated with sealant 62. Furthermore, it is obvious that as more of the exposed surface of the leads 48, 50, and 52 is covered with the sealant 62, the more effective the seal because of the reduced surface area that is available through which the air can enter the windshield 10 via the leads.

As an alternative to filling and sealing the entire notch area 46 with a sealant 62 as previously discussed, which requires the sealant to be cured and preferably that the notch area 46 be filled prior to lamination, other types of materials which do not require curing or filling the notch area 46 may be used to seal lead portions 48, 50 and 52 prior to lamination. The notch area 46 may subsequently be filled and sealed with an additional sealant. More particularly, butyl based coating compositions similar to those disclosed in U.S. Pat. No. 4,593,175 to Bowser et al., which teachings are incorporated by reference, have been used as sealants. In particular, the butyl based composition as described hereinbelow in Table 1 is based on the teachings of the patent and has been used to seal the notch area 46 in windshield 10.

TABLE 1

| Materials | Amount (Parts by Weight) |
| --- | --- |
| 1. BUTYL 165 | 100 |
| 2. VISTANEX LM, MS | 30 |
| 3. STATEX N-550 | 110 |
| 4. ZnO xx4 | 6 |
| 5. HI SIL EP | 10 |
| 6. UNION CARBIDE A-174 silane | 10 |
| 7. ESCOREZ 1315 | 60 |
| 8. VM&P NAPHTHA | 712 |

1. BUTYL 165 is the registered trademark of Exxon Chemical Co. for an isobutylene-isoprene elastomer (IIR).
2. VISTANEX LM, MS is the registered trademark of Exxon Chemical Company for a high molecular weight polyisobutylene resin.
3. STATEX N-550 is the registered trademark of Columbian Chemical Co. for a general purpose amorphous furnance black.
4. Zinc Oxide xx4 grade is manufactured by New Jersey Zinc Co.
5. HI SIL EP is the registered trademark of PPG Industries, Inc. for a hydrated amorphous silica.
6. UNION CARBIDE A-174 is the registered trademark of Union Carbide Corp. for a silane coupling agent; gamma-methacryoxypropyltrimethoxy silane.
7. ESCOREZ 1315 is the registered trademark of Exxon Chemical Co. for a saturated hydrocarbon resin.
8. VM&P NAPHTHA is varnish markers' naphtha; a solvent with a narrow boiling point.

This sealant dries in approximately 5 minutes but still remains tacky. Additional carbon black and/or filler material, such as, e.g. hydrated silica, can be added to the formulation to reduce tack. The coating may be applied in any convenient manner known in the art, e.g.

brush, dauber, or rollers. Although not limiting in the invention, the thickness of this sealant is preferably about 1 mil (0.025 mm). Since the butyl coating does not fill the notch area 46, additional fillers must be used if it is required that the windshield 10 have a flush notch area 46. These fillers may be added before of after lamination.

Soldering flux has also been used to seal the lead portions prior to lamination. Although not limiting in the present invention, in one particular embodiment, the notch area 46 is coated with Kester ® soldering flux formula 1544, which is a fully activated rosin flux available from Litton Industries, Ill. During testing, a mixture of the flux in isopropyl alcohol was applied over the notch area 46 of a prepressed windshield assembly 10. After application, the isopropyl alcohol evaporates almost immediately, leaving a glaze of flux over the notch area 46, sealing the lead portions 48, 50 and 52 and the edge of the notch and prohibiting air intrusion into the windshield while under the positive pressure of the autoclave cycle. The flux remains in the notch area 46 throughout the autoclave cycle and allows for the soldering of the electrical connectors 54, 56 and 58 and the filling and sealing of the notch area 46 after lamination. Flux concentrations ranging from 15 to 100% were tested. A concentration ratio of 25% flux to 75% alcohol by volume provided marginal results, with the interlayer overlaying the lead portions 28, 30 and 34 and the bus bar 24 in the vicinity of the notch area 46 developing some bubbles in an amount up to about 5% of the viewed overlaying interlayer, while flux concentrations of at least 30% by volume eliminated the formation of bubbles during boil testing.

It should be appreciated that although in the preferred embodiment isopropyl alcohol was used as a carrier for the flux, other materials, as are well known by those skilled in the art, may be used.

Flexible epoxy, such as that available from BF Goodrich, Adhesive Systems Division, Ohio, sold under the trade name Plastilock, was also tested as coating sealants. The material is a thixotropic, two-part, lightweight, room temperature curing epoxy sealant that remains flexible at low temperatures. The epoxy was applied over the lead portions 48, 50 and 52 and allowed to dry prior to laminating. Although the epoxy sealed the leads and eliminated bubbling, it was found that the epoxy was difficult to remove from the leads so that the wires 54, 56 and 58 could be connected to the windshield 10 after lamination. However, it was determined that flexible epoxy could be applied to notch area 46 after wires 54, 56 and 58 are connected to the leads to fill in the remaining portion of the notch area 40 and provide an excellent moisture seal, as will be discussed later in more detail. Furthermore, the wires 54, 56 and 58 could be made to lead 48, 50 and 52, respectively, prior to sealing the leads so that the entire notice area 46 could be filled with flexible epoxy.

It is believed that heat resistant paints can also be used to seal the notch area 46 but it is expected that they would pose that same problem as the flexible epoxy with respect to removable of the paint from the leads so that electrical connections can be made to the bus bars.

As an alternative to providing a permanent seal in the notch area 46 prior to lamination, removable or strippable materials can be used to seal the notch area 46 and produce a bubble-free laminated windshield assembly. Although not limiting in the present invention, adhesive tape (not shown), such as duct tape, can be used to temporarily seal the lead portions in the notch area during lamination. With this arrangement, after lamination, the tape is removed, electrical connectors 54, 56 and 58 are attached to the lead portions 48, 50 and 52, respectively, and the notch area 46 is filled with a sealant to protect and seal the lead portions and the electrical connectors.

It is also contemplated that the bubble-free heatable windshield may be produced without using any sealing materials prior to lamination. For example, the formation of bubbles in the vicinity of the notch area 46 may be prevented by sealing the windshield assembly 10 in a vacuum bag prior to lamination, for example as disclosed in U.S. Pat. No. 3,311,517 to Keslar et al. More particularly, the windshield assembly 10 is placed in a bag that is sealed and de-aired. The bag and windshield are then subjected to elevated temperatures and pressures to laminate the assembly. The bag prevents air from diffusing into the windshield in the vicinity of the notch area 46 during lamination.

As an alternative, the windshield 10 may be initially fabricated without a notch, which after lamination, is subsequently cut out of the inboard glass ply 16, for example by using an abrasive jet cutting arrangement, so that electrical connection can be made to the windshield. With this arrangement, air cannot diffuse into the windshield because the inboard glass ply 16 covers the lead portions 48, 50 and 52 during lamination.

Figure 5:
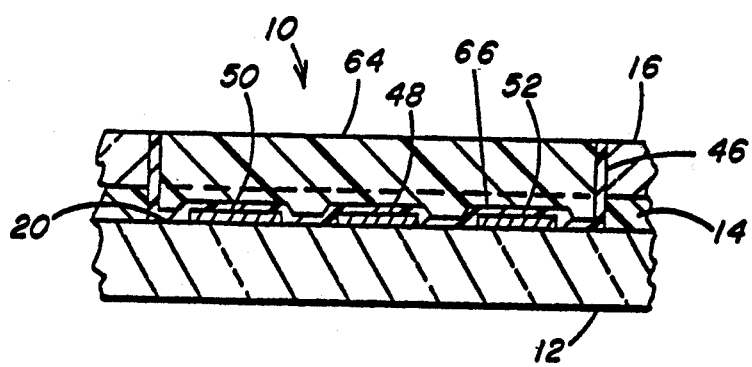
FIG. 5 is a view similar to FIG. 3 of an alternate embodiment of the invention.

To fill in the remaining portion of the notch area, either before or after lamination, and provide an effective moisture seal, the preferred material in the present invention is a flexible epoxy material and in particular, Plastilock ® sealant available from BF Goodrich Company, Ohio, as discussed earlier. Referring to FIG. 5, the epoxy 64 is applied to the notch area 46 preferably after lamination, over the previously applied sealant 66, e.g. soldering flux, in any convenient manner. Although not limiting to the present invention, in a preferred embodiment of the invention, a piece of tape (not shown) may be used to cover the notch area 46 with the flexible epoxy 64 being applied in the space between the tape and the sealed surface 20 of outer glass sheet 12. As an alternative, the flexible epoxy 64 may be applied to the notch area 46 using a caulking gun. A putty knife is used to smooth the surface of the epoxy before it begins to cure.

The notch area 46 may be primed with a surface treatment (not shown) that promote adhesion of the flexible epoxy material to the materials in the notch area. Although not limiting in the present invention, one particular type of surface treatment is a silane solution available from Union Carbide under the tradename Union Carbide ® A1100.

Testing was conducted to compare the performance of unprimed flexible epoxy material to silicone as a moisture barrier. testing performed in accordance with ASTM E96-80 comparing Plastilock ® 435 sealant with Dow Corning ® 982 silicone sealant showed that the flexible epoxy was significantly less permeable to moisture than the silicone, and in particular the epoxy was over seven times less permeable than the silicone after 168 hours of exposure to either water or water vapor. Additional testing in accordance with ASTM F372-78 comparing the moisture barrier characteristics of Plastilock ® 425 with Dow Corning ® silicone sealant showed the epoxy to be about three times less permeable to moisture than the silicone.

The use of the flexible epoxy material to fill the notch area 46 of the assembly 10 provides additional advantages over silicone sealants. For example, polyurethane based adhesives are typically used to install an automotive windshield. The adhesive is placed about the periphery of the windshield assembly 10 to secure it in place. In windshield configurations where the notch area 46 is located such that the polyurethane based adhesive is applied to a portion of the notch area 46, it has been observed that the adhesive will not bond to a silicone sealant. However, polyurethane based adhesives will bond to the flexible epoxy sealant so that the windshield assembly 12 can be properly secured to the vehicle about its periphery.

The use of the flexible epoxy material is also preferred over the use of polyurethane as a notch sealant material. Generally, the epoxy is more resistant to chemical attack from acids, alcohols, and alkalies than the polyurethane. In addition, it is believed that during curing, moisture in the polyurethane may generate $CO_2$ gas within the sealant which may reduce its effectiveness as a moisture seal.

Based on the teachings of this disclosure, it should be apparent that the amount of exposed lead area and the lead material porosity, as well as the type of sealant and the temperature/pressure conditions during lamination each contribute to the effectiveness of the sealing arrangement. In particular, for example, if the laminate is fabricated under lower temperature and/or pressure conditions than those discussed earlier, the sealant material can be less sensitive to these factors and still provide adequate sealing of the notch area. Furthermore, if the exposed lead area is reduced and/or the porosity of the lead material is reduced, a less effective sealant material can be used to adequately seal the notch area.

The forms of the invention shown and described in this specification represents illustrative preferred embodiments and it is understood that various changes may be made without departing from the spirit of the invention as defined in the following claimed subject matter.

We claim:

1. A laminate comprising:
   a pair of glass sheets laminated together about an interlayer;
   a cut out area in a first one of said sheets and said interlayer;
   at least one gas permeable member supported on a second one of said sheets in said cut out area;
   a sealant material in said cut out area, said sealant material applied before said sheets are laminated together as evidenced by the absence of bubbles in said interlayer in the vicinity of said cut out area after prolonged exposure to high temperatures and humidity conditions.

2. The laminate as in claim 1 wherein said laminate is a heatable windshield having heating means between said sheets and said gas permeable member is means to provide electrical access to said heating means.

3. The laminate as in claim 2 wherein said heating means includes a pair of spaced bus bars and an electroconductive member extending along a major surface of said second sheet and between and joined to said bus bars and further wherein said electrical access means includes lead portions extending from said bus bars.

4. The laminate as in claim 3 wherein said electroconductive member is a transparent, electroconductive coating.

5. The laminate as in claim 1 wherein said sealant is air impervious, does not decompose during laminating of said glass sheets to said interlayer, does not give off fumes or other gases during lamination, does not adversely affect the permeable member and is resilient.

6. A laminate comprising:
   a pair of glass sheets laminated together about an interlayer;
   a cut out area in a first one of said sheets and said interlayer;
   a gas permeable member supported on a second one of said sheets, said gas permeable member having portions in said cut out area to provide external access to said member; and
   a sealant material in said cut out area, said sealant material applied to said portions of said gas permeable member in said cut out area and to selected peripheral portions of said first one of said sheets and said interlayer in said cut out area, said sealant material applied to cut out portion of said member and said peripheral portions before said sheets are laminated together as evidenced by minimal formation of bubbles in said interlayer in the vicinity of said cut out area after submerging at least said cut out area of said laminated windshield in water heated to a temperature of about 212° F. (100° C.) for a period of about 2 hours.

7. The laminate as in claim 6 wherein said laminate is a heatable windshield having heating means between said sheets and said gas permeable member is means to provide electrical access to said heating means.

8. The laminate as in claim 7 wherein said heating means includes a pair of spaced bus bars and an electroconductive member extending along a major surface of said second sheet and between and joined to said bus bars and further wherein said electrical access means includes lead portions extending from said bus bars.

9. The laminate as in claim 8 wherein said electroconductive member is a transparent, electroconductive coating.

10. The laminate as in claim 9 wherein said minimal formation of bubbles after prolonged exposure to high temperature and humidity conditions includes bubbles in up to 5% of the interlayer overlaying said leads in the vicinity of said cut out area after boil testing.

11. The laminate as in claim 7 wherein said sealant material is air impervious, does not decompose during lamination of said glass sheets to said interlayer, does not give off toxic fumes or other gases during lamination, does not adversely affect the permeable member, does not contain sulfur, in non-electroconductive and is resilient.

12. The laminate as in claim 11 wherein said sealant material is selected from a group of materials including silicon elastomer sealant, butyl based sealant, flexible epoxy and soldering flux.

13. In a method of making laminate wherein the method includes the steps of:
   providing a first glass sheet;
   providing a gas permeable member on the first sheet adjacent a marginal edge portion of the sheet;
   providing an interlayer and a second glass sheet each having a cut out portion at their marginal edge portions;
   positioning the interlayer between the first and second sheets such that the gas permeable adjacent the marginal edge portion of the first sheet is accessible through a cut out area defined by the cut portions of the second sheet and interlayer; and laminating the first and second sheets together, wherein during laminating gas moves through the gas permeable member at the cut out area between the glass sheets, the improvement comprising:

provided a sealant over the gas permeable member at the cut out area before practicing the laminating step to prevent gas from moving between the sheets during the practice of the laminating step.

14. The method as set forth in claim 13 wherein the laminate is a heatable windshield having heating means between the sheets, the gas is air and the gas permeable member provides electrical access to the heating means.

15. The method as in claim 14 wherein said heating means is an electroconductive coating and the step of providing a gas permeable member on the first sheet includes the step of providing first and second electroconductive bus bars along opposing edges of and interconnected by the coating, wherein a portion of each of the bus bars extends to a peripheral edge of the first sheet and portions of the bus bar are accessible at the cut out area after said laminating step to provide electrical access to the coating.

16. The method as in claim 15 wherein said providing a sealant step includes sealing at least a portion of said exposed bus bar portions at the cut out area prior to the practice of the laminating step.

17. The method as in claim 16 wherein said sealing step includes applying a temperature and pressure resistant, non-electrically conductive sealant over said bus bar portions.

18. The method as in claim 17 wherein said sealing step includes covering the entire exposed bus bar portions.

19. The method as in claim 18 wherein said sealing step further includes filling said notch area with said sealant.

20. The method as in claim 19 wherein said sealing step includes covering said entire exposed bus bar portion with a sealant selected from the group of silicone elastomer sealant, butyl based sealant, soldering flux and flexible epoxy.

21. The method as in claim 20 wherein after said laminating step, further concluding the step of securing electrical connections to said exposed bus bar portions and filling said notch area with additional material such that said material is flush with an exposed major surface of said second glass sheet.

22. The method as in claim 21 wherein said material is flexible epoxy.

23. The method as in claim 15 wherein said bus bars are a silver containing material and said providing a sealant step includes the step of coating at least a portion of the exposed bus bar portions with an essentially sulfur free sealant.

* * * * *

UNITED STATES PATENT AND TRADEMARK OFFICE
CERTIFICATE OF CORRECTION

PATENT NO. : 5,213,828
DATED : May 25, 1993
INVENTOR(S) : Winter et al.

It is certified that error appears in the above-indentified patent and that said Letters Patent is hereby corrected as shown below:

Claim 11, column 10, line 52, delete the word "in" and insert the word --is--.

Claim 13, column 10, line 67, insert the word --member-- before the word "adjacent".

Signed and Sealed this

Tenth Day of September, 1996

Attest:

BRUCE LEHMAN

Attesting Officer

Commissioner of Patents and Trademarks